United States Patent [19]

Lean et al.

[11] Patent Number: 5,024,286
[45] Date of Patent: Jun. 18, 1991

[54] MOTOR ASSISTED PEDAL CYCLE

[76] Inventors: Gordon D. Lean; Anthony H. K. Dennis, both of Church Lane, The Old Coach House, Fenny Compton, Great Britain

[21] Appl. No.: 435,373
[22] PCT Filed: Mar. 14, 1989
[86] PCT No.: PCT/GB89/00263
  § 371 Date: Jan. 16, 1990
  § 102(e) Date: Jan. 16, 1990
[87] PCT Pub. No.: WO89/08579
  PCT Pub. Date: Sep. 21, 1989

[30] Foreign Application Priority Data

Mar. 14, 1988 [GB] United Kingdom ................. 8806042

[51] Int. Cl.$^5$ ....................... B62M 7/00; B62M 23/02
[52] U.S. Cl. .................................. 180/206; 180/65.2; 180/207
[58] Field of Search .............. 180/219, 220, 202, 205, 180/206, 207, 65.1, 65.2, 65.3, 65.4, 65.8

[56] References Cited

U.S. PATENT DOCUMENTS

| | | | |
|---|---|---|---|
| 2,836,732 | 5/1958 | Newlin | 180/65.1 |
| 4,085,814 | 4/1978 | Davidson et al. | 180/206 |
| 4,122,907 | 10/1978 | Davidson et al. | 180/206 |
| 4,364,448 | 12/1982 | Ikuma | 180/206 |

FOREIGN PATENT DOCUMENTS 1559822  1/1980  United Kingdom ................. 180/206

*Primary Examiner*—Mitchell J. Hill
*Attorney, Agent, or Firm*—Fleit, Jacobson, Cohn, Price, Holman & Stern

[57] ABSTRACT

A motor assisted pedal cycle (30) comprises a pair of pedals (32) connected by crank arms (1,2) to a pedal shaft (3) which is connected to a hub (7) by means of a torsion spring (5). The hub (7) carries a drive sprocket (8) for a chain (36) to connect the hub (7) to the rear wheel of the bicycle. An internal combustion engine (38) is mounted on the bicycle frame and has an output gear for meshing with a drive gear (4) provided on the hub (7). Castellated disks (9,10) are mounted on the pedal shaft (3) and hub (7), respectively, whereby relative displacement of the pedal shaft (3) and hub (7) can be detected by means of an optical sensor (11) provided at the periphery of the disks (9,10). The output of the optical sensor (11) is used to control the engine whereby starting, stopping, and throttle control of the engine is automatically controllable by the force applied to the pedals of the bicycle.

17 Claims, 3 Drawing Sheets

5,024,286

MOTOR ASSISTED PEDAL CYCLE

FIELD OF THE INVENTION

This invention relates to a motor assisted pedal cycle and in the preferred embodiment provides a pedal cycle in which the motor can be controlled automatically in response to the operation of the pedals.

BRIEF SUMMARY OF THE INVENTION

According to one aspect of the present invention a motor assisted pedal cycle comprises: a pair of foot operated rotary pedals for applying a driving torque to a wheel of the cycle; a motor for applying a driving torque to a wheel of the cycle; means for sensing the torque reduced by foot pressure on the pedals as the pedals are rotated to drive the cycle; and control means responsive to the torque sensing means for controlling the motor in response to the torque produced by foot pressure on the pedals.

With a preferred embodiment of the invention a cycle can be produced having a motor, for example an internal combustion engine, which is controlled automatically to assist the rider of the cycle in response to the manner in which the rider of the cycle applies force to the pedals of the cycle. In a particularly preferred embodiment of the invention the throttle opening of an internal combustion engine is increased as the torque applied to the pedals and/or the speed of rotation of the pedals is increased. In the preferred embodiment, the internal combustion engine is started automatically when certain predetermined threshold conditions are reached, and is stopped automatically in response to cessation of pedal rotation.

BRIEF DESCRIPTION OF THE DRAWINGS

The invention will be better understood from the following detailed description of a preferred embodiment thereof, given by way of example only with, reference to the accompanying drawings wherein.

DETAILED DESCRIPTION OF THE PREFERRED EMBODIMENT

Figure 1:
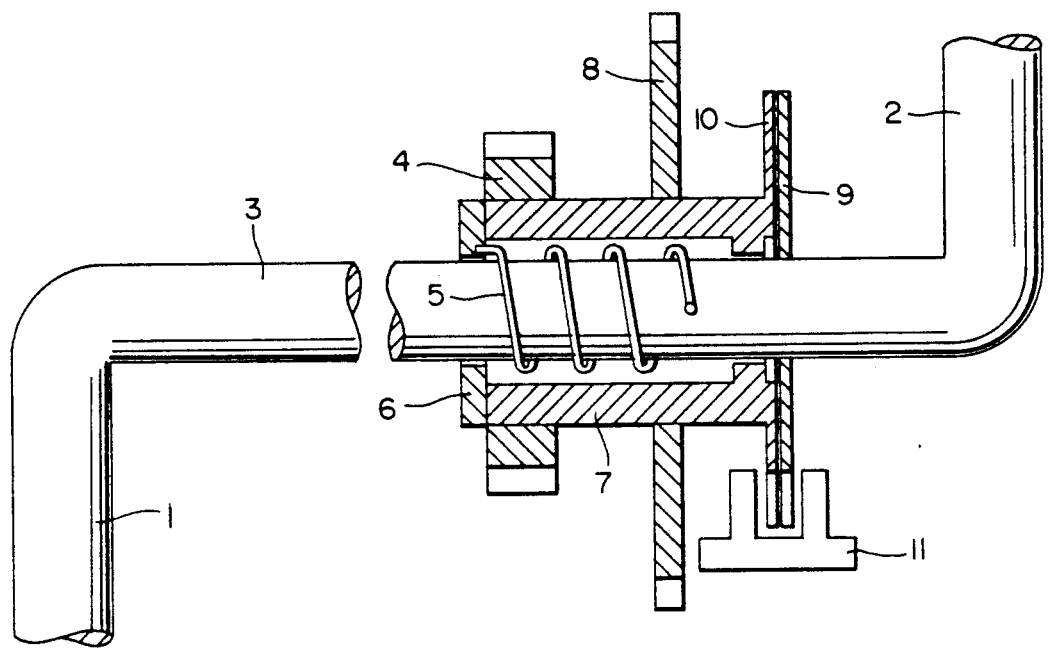
FIG. 1 is a schematic cross-sectional view which illustrates a portion of a bicycle in accordance with the invention.
Figure 2:
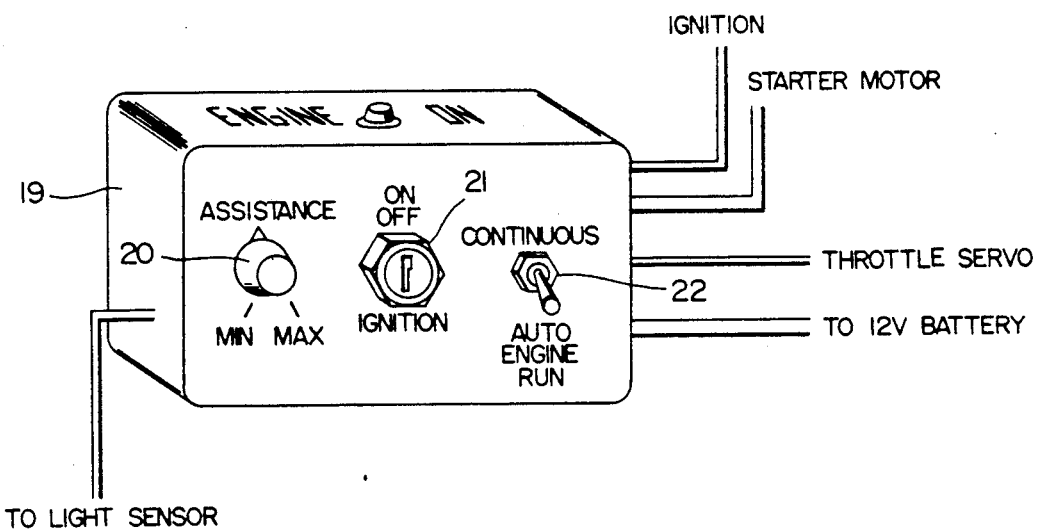
FIG. 2 illustrates a control box layout.

The preferred embodiment of the invention is in the form of a bicycle 30 having a conventional pedal arrangement comprising a pair of pedals (32) connected by crank arms 1 and 2 to a common pedal shaft 3. The pedal shaft is journaled in appropriate bearings mounted on the frame of the bicycle so that the rider of the bicycle may place his feet upon the pedals in the conventional manner. The pedal shaft 3, as described in more detail hereinafter, applies a drive force to one wheel 34 of the bicycle, e.g. by means of a conventional roller chain arrangement. A motor, e.g. a small internal combustion engine, is provided to apply a driving torque to one wheel of the bicycle.

Drive from the pedal shaft 3 is applied to the pedal driven wheel of the cycle by means of a sprocket wheel 8 which drives the rear wheel of the bicycle by way of a chain 36. The sprocket wheel 8 is mounted on a hub 7 which is rotationally mounted on the frame of the bicycle. A drive gear 4 is also mounted on the hub 7 and is engaged by an output gear of an internal combustion engine 38 mounted on the bicycle frame so that drive from the internal combustion engine is transferred to the sprocket 8 by the gear 4 and hub 7.

The hub 7 is connected to the pedal shaft 3 by means which permit limited relative angular displacement of the hub relative to the pedal shaft 3. In the illustrated embodiment, a torsion spring 5 is coupled to the pedal shaft 3 at one end thereof and to a plate 6 at the other end thereof. The plate 6 is connected to the hub 7 which is rotatably supported on the bicycle frame, and to which the gear 4 and main drive sprocket 8 are connected. The arrangement is such that as the pedals are rotated to drive the sprocket 8 the pedal shaft can advance to a limited extent relative to the hub 7, the amount of advance being progressive up to a predetermined limit in response to progressively higher torque applied to the pedal shaft by foot pressure on the pedals.

Figure 3:
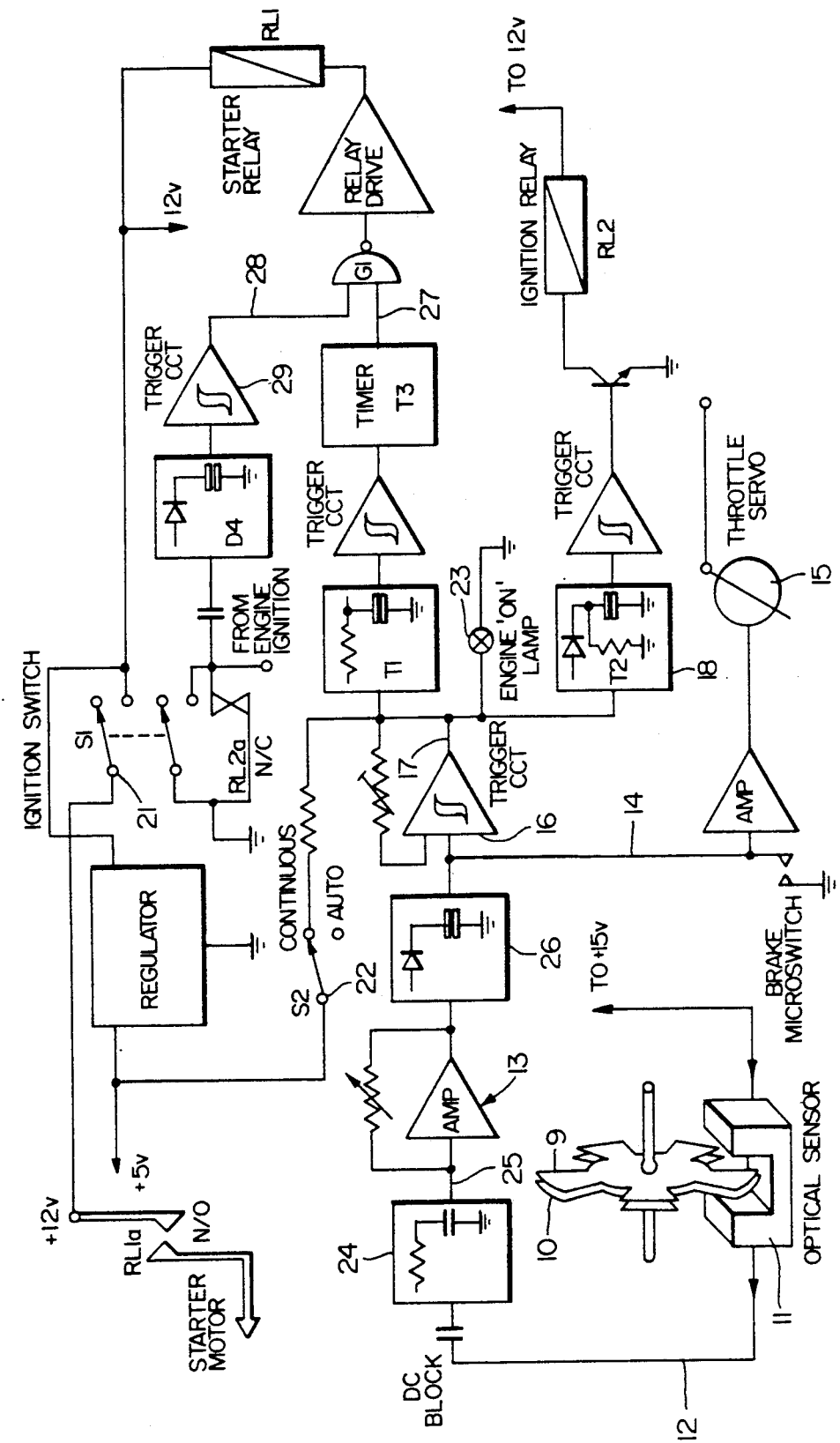
FIG. 3 illustrates a control circuit.
Figure 4:
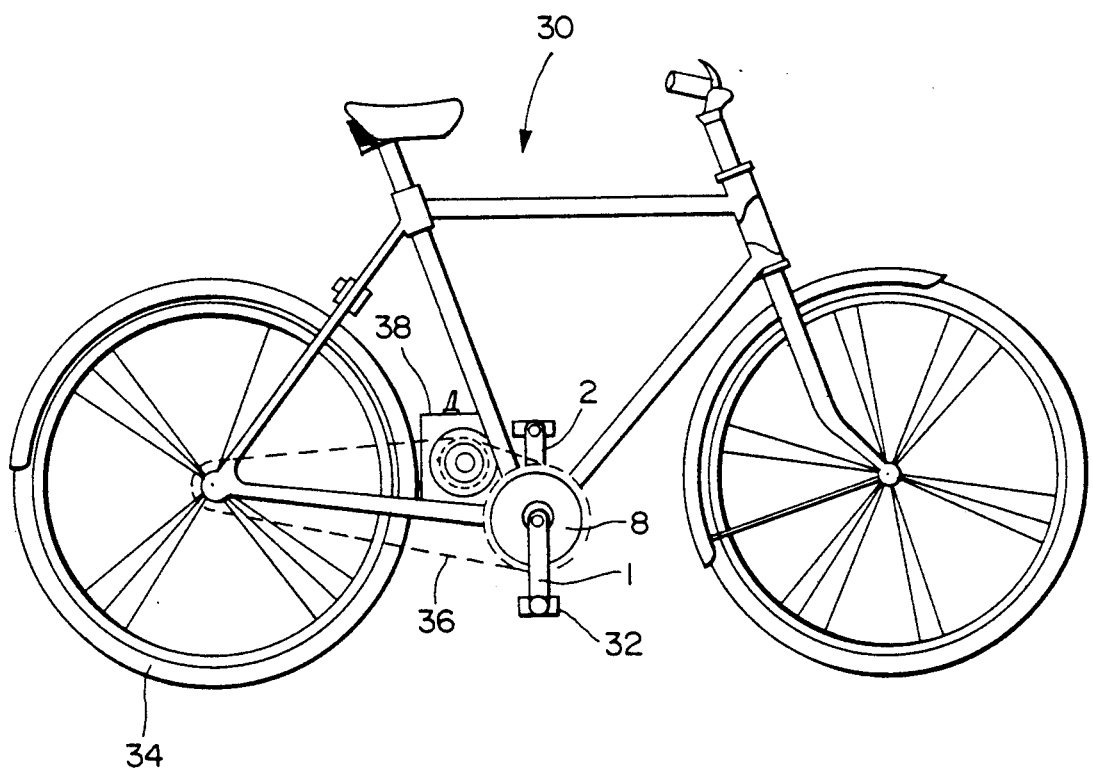
FIG. 4 is a schematic elevational view of a typical bicycle with which the invention is used.

A first disk 9 is fast with the pedal shaft 3 and is positioned adjacent to second disk 10 fast with the hub 7. The disks 9,10 have castellated peripheries as illustrated in FIG. 3, each disk having a multiplicity of cutaway portions of equal circumferential extent, the cutaway portions of each disk being separated by lands of circumferential extent equal to that of the cutaway portion. In the rest position when no torque is applied to the pedal shaft the torsion spring 5 places the pedal shaft 3 and hub 7 in a first predetermined relative position in which the lands of the disk 9 are in register with the cutaway portions of the disk 10, whereby when viewed in a direction parallel to the rotational axis of the pedal shaft 3, the disks 9 and 10 together form a solid disk having no visable slot therein. When force is applied to the pedals, a torque is applied to the shaft 3 which permits it to advance relative to the hub 7 and moves the slots of the disk 9 progressively into register with the slots of the disk 10. The connection between the shaft 3 and the hub 7 permits only limited relative angular displacement therebetween, and at the maximum available angular displacement the slots of the disk 9 are fully in register with the slots of the disk 10. In this position, when viewed in a direction parallel to the axis of the pedal shaft 3 the slots 9,10 appear to have a slotted periphery of equal mark-to-space ratio.

An optical sensor 11 is positioned to provide an output signal whenever a slot is positioned between the source and the detector of the sensor. Accordingly, as the disks 9,10 rotate in use a pulse output signal is provided by the optical sensor, the frequency of the pulse is being a measure of the rotational speed of the disks 9,10 and the mark-to-space ratio of the pulses being a measure of the degree of register of the disks 9,10 which in turn is determined by the torque applied to the shaft 3 by pedal pressure.

The output 12 of the sensor is applied to a variable servo amplifier 13 to produce an output signal 14 for controlling a servo 15 connected to the engine throttle. The output of the amplifier 13 is also applied to a trigger circuit 16 which starts the engine in response to a predetermined input from the amplifier 13. The trigger circuit may typically be arranged to start the engine if the output of the sensor 12 achieves a predetermined mark-to-space ratio for a predetermined period of time. The output 17 of the trigger circuit 16 energizes an ignition relay RL2 to turn on the engine ignition and then energizes a starter relay RL1 to energize the starter motor of the engine. If the output of the amplifier 13 falls below the level necessary to trigger the trigger circuit 16 for a predetermined length of time a trigger circuit 18 switches off the engine ignition.

In operation, a rider wishing to use the engine assistance pedals the bicycle for a few seconds applying sufficient pedal pressure to produce an output necessary to trigger the circuit 16. The engine then starts, and provides assistance in proportion to the force applied to the pedals. By the design of the control circuit, as the rider pedals faster less pressure is required on the pedals in order the achieve full throttle on the engine.

A control box 19 is provided to enable the use of the bicycle to control operation of the automatic control circuit. The control box 19 preferably is provided with a control 20 which varies the operation of the servo amplifier to allow the amount of assistance from the engine to be adjusted. The control box also provides a manual on/off switch 21 for switching off the engine completely if not required and a "auto/continuous" switch 22 which, when in the CONTINUOUS position allows the engine to run continuously once started. When the switch 22 is in the AUTO position the trigger circuit 18 is able to turn the engine off after a predetermined period of insufficient output from the amplifier 13, as mentioned above.

When the switch 22 is in the CONTINUOUS position the bicycle operates generally in the manner of a conventional moped, but with the engine throttle control being responsive to pedal pressure rather than manual control. In the AUTO position the engine will only start if the rider exceeds a predetermined pedal pressure for a predetermined period of time, and thereafter will run continuously under the control of pedal pressure until pedal pressure falls below a predetermined level for sufficiently long to allow the trigger circuit 18 to stop the engine.

Preferably, an "engine on" lamp 23 is provided to show the rider that he has exceeded the predetermined pedal pressure required to start the engine in the AUTO mode. If the light remains on for more than a few seconds the rider knows the engine will start and will remain running for a predetermined period after the "engine on" lamp has extinguished.

If the rider wishes to prevent the automatic control system from switching the engine off whilst he is, for example, stationary at traffic lights without switching the switch 22 to the CONTINUOUS mode, he may apply foot pressure to one of the pedals and gently rock the bicycle backwards and forwards to produce sufficient output from the amplifier 13 to maintain the trigger circuit 16 energized.

Means are preferably provided for adjusting the torque which must be applied to the pedal shaft in order to achieve maximum throttle. Such adjustment means may comprise means for adjusting the force of the spring 5, or may consist of an electrical adjustment whereby full throttle is achieved before the slots of the disk 9 come fully into register with the slots of the disk 10.

In the illustrated embodiment the output 12 of the sensor 11 is fed first to an integrator 24 to provide an output voltage 25 proportional to the mark-to-space ratio of the pulses from the sensor, i.e. an output voltage proportional to the force applied to the pedals. By careful design, as the speed of rotation of the pedals is increased and hence the sensor wave form is generated at a higher frequency the output voltage 25 can also be made proportional to the frequency. Thus, when the pedals are pressed either at great speed or with high pressure the output voltage from the integrator will be high.

The output voltage 25 is then amplified by the amplifier 13 and is averaged by an appropriate circuit 26 to eliminate fluctuations in control voltage as a result of the fact that constant pedal pressure will not be applied during the whole cycle of rotation of the shaft 3.

When the output of the averager 26 is sufficient to trigger the trigger circuit 16 as described above the output of the trigger circuit is applied to a delay circuit T1 which, after an appropriate delay, applies an input 27 to a gate G1. G1 then energizes the starter relay RL1 if no input 28 is present at the gate G1. As soon as the engine starts engine ignition pulses are applied to a trigger circuit 29 in order to produce an input 28 at gate G1 to de-energize the relay RL1.

We claim:

1. An engine assisted pedal cycle comprising: a pair of foot operated rotary pedals for applying a driving torque of varying magnitude to a wheel of the cycle; an engine for applying a driving torque of varying magnitude to a wheel of the cycle; means for sensing the magnitude of the torque produced by foot pressure on the pedals as the pedals are rotated to drive the cycle; and control means responsive to the torque sensing means for controlling the magnitude of the torque applied by the engine in response to the magnitude of the torque produced by foot pressure on the pedals.

2. A pedal cycle as claimed in claim 1 wherein the torque sensing means comprises: a first disk connected to the pedals to receive rotary drive therefrom; a second disk coaxial with the first disk and connected to a wheel of the cycle to transmit drive thereto; coupling means coupling the first disk to the second disk in a manner permitting limited relative rotational displacement between said first and second disks, the rotational displacement progressively increasing from zero when no torque is applied to the pedals to a maximum as torque is progressively applied to the pedals; and means for sensing the relative displacement of the disks.

3. A pedal cycle as claimed in claim 2 and further comprising: frequency sensing means for sensing the frequency of rotation of the pedals, the control means being responsive to the frequency sensing means for controlling the engine in response to the frequency of rotation of the pedals and the magnitude of the torque produced by foot pressure on the pedals.

4. A pedal cycle as claimed in claim 2 wherein: each of said first and second disks is provided with at least one cutaway portion, said at least one cutaway portion of one disk being out of register with a corresponding cutaway portion in the other disk when no torque is applied to the pedals and being in register with a corresponding cutaway portion in the other disk when the disks are at the limit of permitted relative rotational displacement; the cutaway portions having an intermediate degree of register as the relative rotational displacement varies between the out of register and in register positions; and the means for sensing the relative displacement of the disks comprises means for sensing the degree of register between the cutaway portions.

5. A pedal cycle as claimed in claim 4 wherein: said at least one cutaway portion on each disk comprises a plurality of substantially identical circumferentially extending slots separated by lands having a circumferential extent substantially equal to the circumferen extent of the slots, the lands of one disk being in register with the slots of the other disk when no torque is applied to the pedals and being in register with the lands of the other disk when the disks are at the limit of permitted rotational displacement.

6. A pedal cycle as claimed in claim 5 and further comprising: frequency sensing means for sensing the frequency of rotation of the pedals, the control means being responsive to the frequency sensing means for controlling the engine in response to the frequency of rotation of the pedals and the magnitude of the torque produced by foot pressure on the pedals.

7. A pedal cycle as claimed in claim 6 wherein: the engine comprises an internal combustion engine; and the control means is operated to start the engine in response to a predetermined set of pedal movement characteristics.

8. A pedal cycle as claimed is claim 7 and further comprising: means for overriding the control means to provide for selected starting and operation of the engine.

9. A pedal cycle as claimed in claim 7 wherein: the control means is operative to stop the engine in response to one of a cessation of pedal movement and a reduction in pedal force below a predetermined limit.

10. A pedal cycle as claimed in claim 9 and further comprising: means for overriding the control means to provide for selected starting and operation of the engine.

11. A pedal cycle as claimed in claim 4 and further comprising:
 frequency sensing means for sensing the frequency of rotation of the pedals, the control means being responsive to the frequency sensing means for controlling the engine in response to the frequency of rotation of the pedals and the magnitude of the torque produced by foot pressure on the pedals.

12. A pedal cycle as claimed in claim 11 wherein: the engine comprises an internal combustion engine; and the control means is operated to start the engine in response to a predetermined set of pedal movement characteristics.

13. A pedal cycle as claimed in claim 12 wherein: the control means is operative to stop the engine in response to one of a cessation of pedal movement and a reduction in pedal force below a predetermined limit.

14. A pedal cycle as claimed in claim 13 and further comprising:
 means for overriding the control means to provide for selected starting and operation of the engine.

15. A pedal cycle as claimed in claim 1 and further comprising:
 frequency sensing means for sensing the frequency of rotation of the pedals, the control means being responsive to the frequency sensing means for controlling the engine in response to the frequency of rotation of the pedals and the magnitude of the torque produced by foot pressure on the pedals.

16. A pedal cycle as claimed in claim 1 wherein: the engine comprises an internal combustion engine; and the control means is operated to start the engine in response to a predetermined set of pedal movement characteristics.

17. A pedal cycle as claimed in claim 1 wherein: the control means is operative to stop the engine in response to one of a cessation of pedal movement and a reduction in pedal force below a predetermined limit.

* * * * *